United States Patent
Morello et al.

(10) Patent No.: US 6,176,746 B1
(45) Date of Patent: Jan. 23, 2001

(54) ELECTRICAL CONNECTOR HOUSING WITH MULTI FUNCTIONAL COVER

(75) Inventors: John R. Morello, Warren; Jon C. Hobbs, Burghill, both of OH (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/302,103

(22) Filed: Apr. 29, 1999

(51) Int. Cl.[7] .................................................. E05D 15/50
(52) U.S. Cl. .............................................. 439/718; 16/232
(58) Field of Search ................................... 439/142, 718; 220/844, 840, 817; 16/232, 231

(56) References Cited

U.S. PATENT DOCUMENTS

| | | | |
|---|---|---|---|
| 268,873 | * 12/1882 | Dayton | 16/232 |
| 3,069,541 | * 12/1962 | Thomsen et al. | 16/232 |
| 4,679,885 | 7/1987 | Nestor et al. | 439/620 |
| 4,687,270 | 8/1987 | Plyler et al. | 439/350 |
| 4,985,962 | * 1/1991 | Weber | 16/232 |
| 5,212,849 | * 5/1993 | Aihara | 16/232 |
| 5,577,628 | * 11/1996 | O'Neil et al. | 220/840 |
| 5,681,174 | 10/1997 | Correll, Jr. et al. | 439/135 |

\* cited by examiner

*Primary Examiner*—Neil Abrams
(74) *Attorney, Agent, or Firm*—Richard A. Jones

(57) ABSTRACT

An electrical connector housing, such as an automotive fuse housing, is closed or opened by a standard cover that can be swung open in two directions, or pulled straight off. Cooperating pairs of hinge pins on the housing and resilient cantilever beams on the cover serve as either a releasable latch, or as a hinge, or as a pair of releasable latches, depending on the opening mode desired.

4 Claims, 2 Drawing Sheets

ELECTRICAL CONNECTOR HOUSING WITH MULTI FUNCTIONAL COVER

This invention relates to electrical connector housings in general, and specifically to a housing with a multi functional cover that can be easily attached, closed and opened in one of several different orientations.

BACKGROUND OF THE INVENTION

Electrical connector housings, especially automotive electrical system fuse housings, need a removable or easily opened cover in order to allow access to change the fuse. Known housings of this type provide for only a single manner and direction of opening. That is, the cover may be swung open about a single axis and in a single direction, or pulled straight off. In different vehicle locations, there may be room or access to allow only one direction of cover opening. This necessitates the use of different housing and cover combinations at differing locations, which increases the inventory of different parts and consequent costs.

SUMMARY OF THE INVENTION

The invention provides a housing and cover combination which, with a single pair of parts, allows the housing cover to swing open in two alternate directions, or to be pulled straight off. In addition, a unique hinge/latch mechanism is disclosed which can serve alternately as either a hinge or as an easily released latch. The two parts are manufactured and assembled in the same fashion regardless of the desired opening direction, so there is maximum consolidation of parts, manufacturing and assembly steps.

DESCRIPTION OF THE PREFERRED EMBODIMENT

Figure 1:
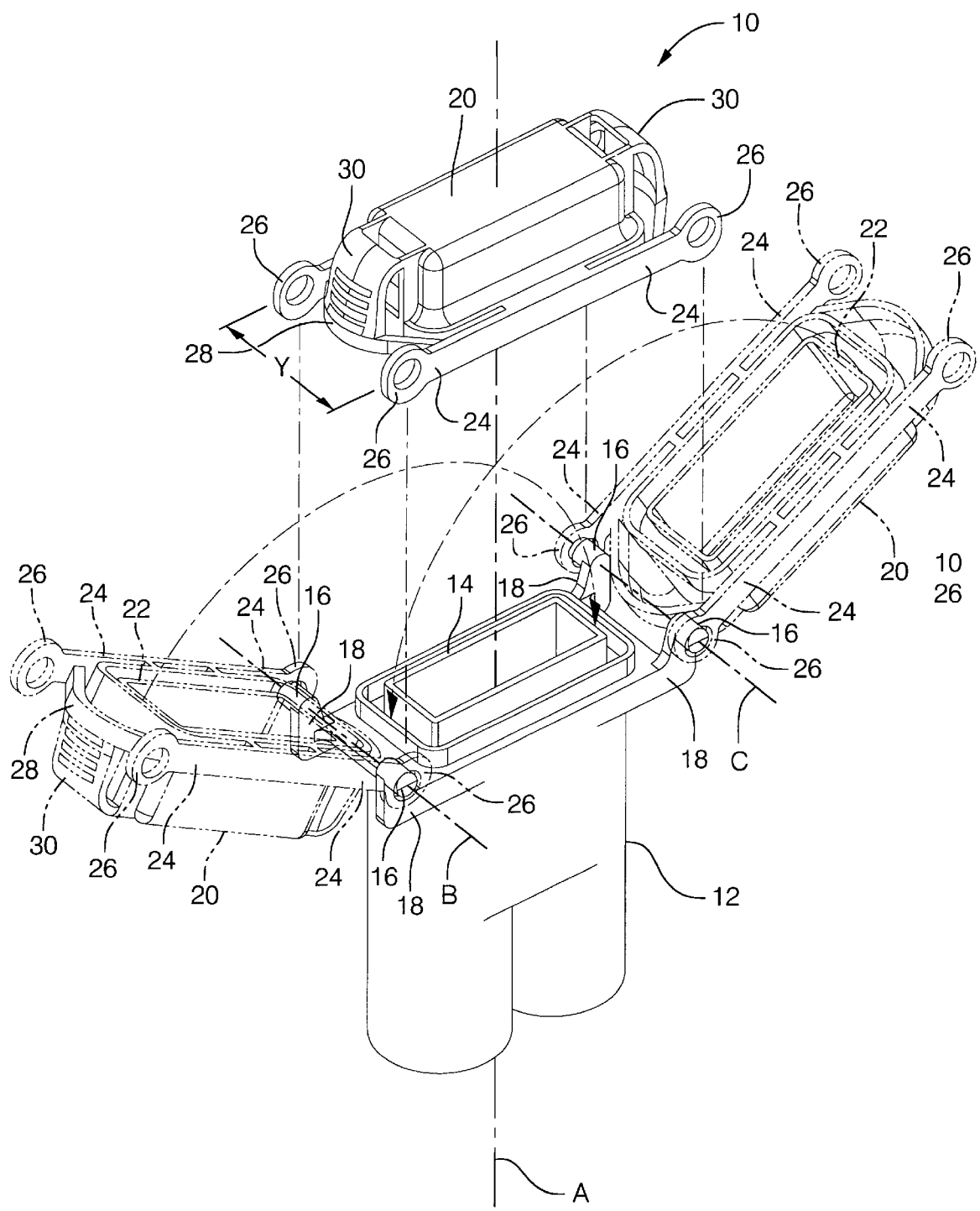
FIG. 1 is a perspective view of a housing and cover assembly made according to the invention shows the cover opening in three alternate direction.
Figure 2:
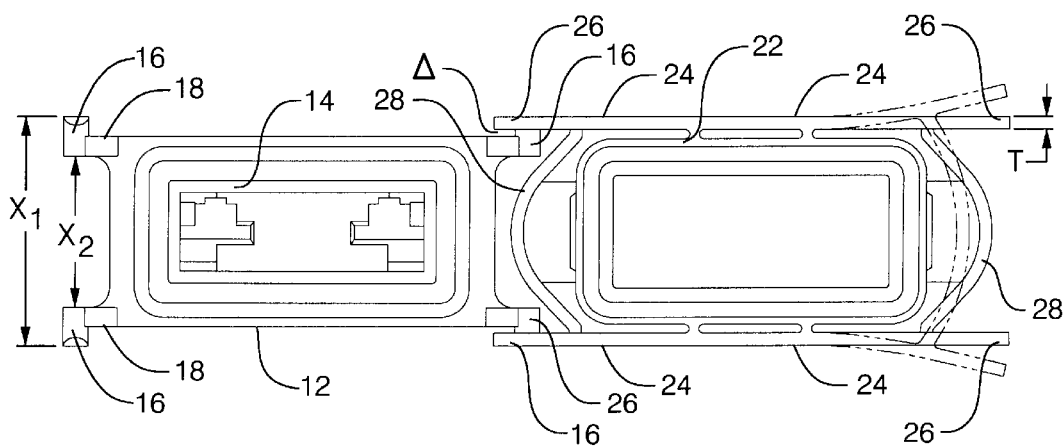
FIG. 2 is a top plan view of the housing with cover assembly opened to one side, showing the unlatching motion in dotted lines.

Referring first to FIGS. 1 and 2, an electrical connector housing and cover assembly according to the invention is indicated generally at 10. Housing 12 is a generally hollow, molded plastic body with a central axis A and a generally rectangular open end 14 lying in a plane generally perpendicular to axis A. At four corners, symmetrically disposed relative to the open end 14, four generally cylindrical pins 16 are fixed to the housing 12. The pins 16 define two axes of rotation, B and C, which are parallel to one another, perpendicular to axis A, and located on opposite sides of the open end 14. The pins 16 form two opposed pairs, which are spaced apart at their inner ends by a distance X2, and which also project outwardly from the outer surface of housing 12 on L shaped legs 18, so as to not overlay any the rest of housing 12. This conveniently allows the pins 16 to be molded integrally to housing 12, by and with a single pair of molds that part straight along the central axis A. The outer ends of each opposed pair of pins are spaced apart by a distance X1, and the top edges of the outer ends of each pin 16 are chamfered off slightly, for a purpose described below.

Still referring next to FIGS. 1 and 2, cover 20 is also a generally hollow, molded plastic body, with an open end defined by a rectangular lip 22. Lip 22 is sized to fit closely into and over the open end 14 of housing 12, but without binding, thereby closing and sealing it. Integrally molded to each side of cover 20 are a pair of co linear, oppositely projecting cantilever beams 24, each of which terminates in an annular eye 26. The beams 24 are sufficiently thin (thickness indicated at T) so as to be elastically (reversibly) flexible slightly away from the sides of the cover 20, and apart from one another. The eyes 26 have a diameter slightly larger than the diameter of the pins 16, and are located so as to match the location of the outer ends of the opposed pairs of housing pins 16. More specifically, the opposed pairs of beam eyes 26 are, in an unflexed condition of the beams 24, spaced apart by a distance Y that is approximately equal to (or slightly less than) the distance X1 referred to above. Integrally molded between each opposed pair of beams 24 is an outwardly curved web 28, connected to each. In a free, unstressed state, web 28 is convexly curved relative to cover 20, as shown in FIG. 2 in solid lines. Web 28 is thin enough to be inwardly and elastically flexible from its free state to a flatter (but still outwardly curved) condition, shown in dotted line. So pushing in on web 28 effectively lengthens it, and applies an outward pressure to the opposed pair of beams 24 that pushes them apart a distance greater than X1. The converse is true, as well. That is, the application of an outward pressure on the opposed pair of beams 24 sufficient to push them apart would, in turn, pull the web 28 inwardly to the same location. This interaction of each web 28 and the opposed pair of beams 24 that it interconnects allows the pins 16 and beam eyes 26 to function as described below. In addition, in the embodiment disclosed, each web 28 is strengthened by an integrally molded buttress 30, which extends from the top edge of web 28 to the top surface of cover 20. Buttress 30 serves a function described next.

Referring next to FIG. 2, one of the ways that cover 20 can be attached to housing 12 is by pushing either pair of beam eyes 26 down forcefully over either pair of opposed pins 16. The force generated by this engagement spreads the beams 24 apart until the eyes 26 snap over the ends of the pins 16, allowing the beams 24 to return to their free state. As noted above, free state spacing Y of the beams 24 is substantially identical to the outer end spacing XI of the opposed pins 16, so that the beams 24 can spread apart minimally, and yet still overlap with and be retained to the pins 16 when they snap back. There is a clearance A between the inner surface of each beam 24 and the side of the cover 20 which is slightly less than the beam thickness T. This assures that as the cover 20 slides side to side, neither beam 24 will slip off of its pin 16.

Figure 3:
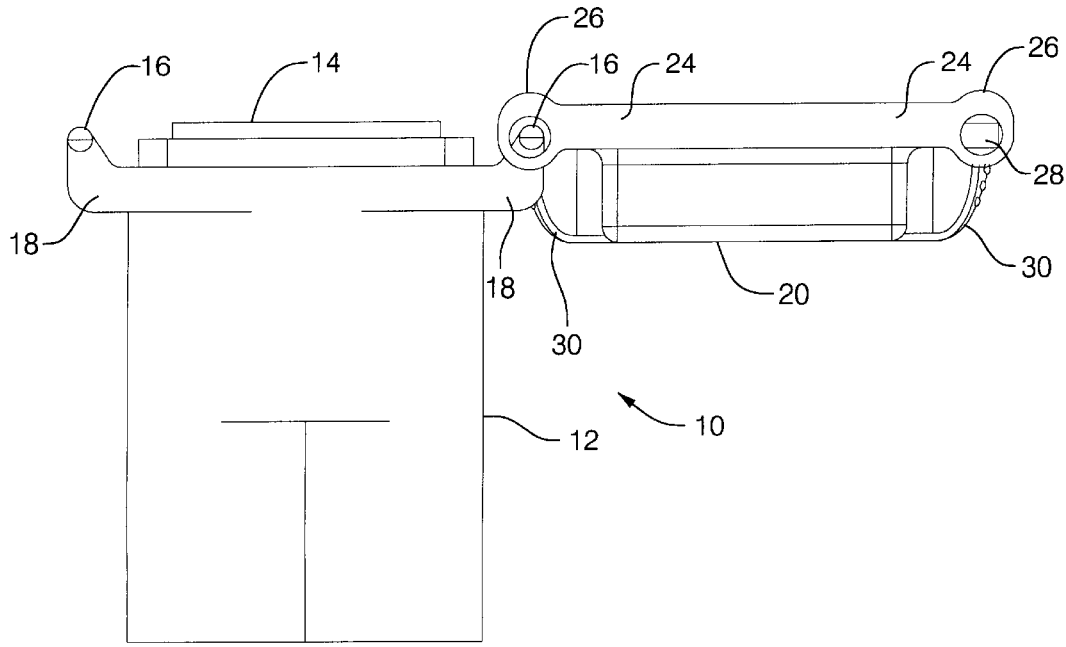
FIG. 3 is a side view of FIG. 3.

Referring next to FIGS. 2 and 3, when only one pair of beams 24 is attached as described above, the cover 20 is hinged to housing 12 so as to rotate about either axis B or C. To close cover 20 fully, it is simply rotated over and down onto the housing open end 14, along one of the dotted line arcs shown in FIG. 1, about axis B or C. This automatically brings the other pair of beams 24 into engagement with the other pair of pins 16, just as described above. Now, however, the other pair of beams 24 and pins 16 acts as a latch, rather than as a hinge. As cover 20 is fully closed, the curved webs 28 do not bind on the housing 12, fitting instead with some clearance between the inner ends of the pins 16 (within the space X2) and also within the clearance between the L shaped legs 18 and the outer surface of housing 12. A third option for simultaneously attaching and closing cover 20 is to push it straight down onto housing open end 14, along the housing central axis A, thereby snapping both pair of beams 24 over both pairs of opposed pins 16, in one step.

Referring again to FIGS. 2 and 3, all three of the closing actions described above can be reversed. By pressing in on either web 28, the respective beams 24 that it connects are spread apart far enough to pull off of the pins 16, allowing the cover 20 to be swung up in either direction, about either axis B or C, to open housing 12. The buttress 30 provides a convenient surface to grasp to apply the pressing force to the web 28, and to then pull up on to swing cover 20 up and out. Alternately, both buttresses 30 can be pressed inwardly at once, pinching both webs 28 to disengage both pair of beams 24, allowing cover 20 to be pulled straight off along central axis A. As shown, cover 20 is short enough that an average human hand could squeeze both webs 28 inwardly and toward one another at once. This gives maximum packaging flexibility to the housing 12 and cover assembly 10. That is, the assembly 10 could be packaged within the vehicle in a location where it could swing open only about axis B, or only about C, or where it was blocked from swinging open in either direction, and could be pulled only straight out. Or, several such assemblies 10 could be mounted in multiple locations that were so limited. Again, only the two parts 12 and 20 are needed to accommodate all three possible situations.

Variations of the embodiment disclosed. Most fundamentally, the pins 16 and beams 24–web 28 structures could be reversed between the housing 12 and cover 20. This would be less convenient, since the depressed web 28 (and buttress 30) could not simultaneously serve as a handle to pull cover 20 up. Or, the pins 16 could be formed at the end of the flexible beams 24, and the eyes 26 could be rigidly molded to the housing 12. As disclosed, the webs 28 join the beams 24 at a point inboard of the pins 16 and eyes 26, which is more efficient, in terms of leverage on the beams 24, than locating the webs 28 outboard. However, putting the webs 28 outboard would obviate the need to provide clearance for the webs 28 between the opposed pairs of pins 16. The beams 24 need not originate from a common, integrally molded hinge point, as shown, although that, too, is a convenient design. Any concave, generally circular feature on the beams 24 designed to fit closely over the ends of the pins 16 would function as a rotating half of the hinge mechanism, as do the open eyes 26, but the open eyes 26 are far easier to mold than a closed ended cap, or the like, would be.

What is claimed is:

1. A connector housing and cover assembly, comprising, a housing having a central axis and an open end lying in a plane substantially perpendicular to the central axis, a cover sized to fit over and said housing open end in a closed position, two opposed pairs of generally cylindrical pins on one of said housing and cover and located, when said cover is closed, on opposite sides of said housing open end, so as to define a pair of rotation axes perpendicular to said central axis, a pair of parallel, flexible cantilever beams on the other of said housing and cover having a pair of generally cylindrical, concave features sized to make a close fit over the ends of a respective opposed pairs of pins, when said cover is in a closed position, and, a convexly curved web molded between each pair of cantilever beams that is elastically flexible from a free state position inwardly, toward said cover, to a stressed condition that is sufficiently longer to spread either pair of cantilever beams elastically apart to a distance greater than their respective pair of cylindrical pins, whereby, when said cover is in its closed condition, either pair of beams may be reversibly flexed apart to release the concave features from one pair of pins, allowing the cover to be rotated to an open position about the other pair of pins, or both pairs of beams may be concurrently flexed apart to release both pair of concave features and thereby allow the cover to be removed along the central axis.

2. An assembly according to claim 1, further characterized in that the beams are integrally molded to the cover, and the cylindrical pins are integrally molded to the housing.

3. An assembly according to claim 2, further characterized in that said concave features comprise open circular eyes.

4. An assembly according to claim 3, further characterized in that each of said webs is located inboard of a respective pair of pins.

* * * * *